United States Patent [19]

Shimizu

[11] Patent Number: 5,165,047
[45] Date of Patent: Nov. 17, 1992

[54] DRIVING CIRCUIT FOR VIBRATION WAVE DRIVEN MOTOR

[75] Inventor: Masao Shimizu, Kawasaki, Japan

[73] Assignee: Canon Kabushiki Kaisha, Tokyo, Japan

[21] Appl. No.: 839,280

[22] Filed: Feb. 25, 1992

Related U.S. Application Data

[63] Continuation of Ser. No. 518,233, May 7, 1990, abandoned, which is a continuation of Ser. No. 357,785, May 30, 1989, abandoned.

[30] Foreign Application Priority Data

May 30, 1988 [JP] Japan .................. 63-132151

[51] Int. Cl.⁵ .............................. H01C 4/08
[52] U.S. Cl. .................... 318/116; 310/316; 310/323
[58] Field of Search .............. 318/116, 118, 445, 448, 318/460, 696, 655; 310/51, 316, 317, 319, 323, 328

[56] References Cited

U.S. PATENT DOCUMENTS

| | | | |
|---|---|---|---|
| 3,889,166 | 6/1975 | Scurlock | 318/116 |
| 4,233,359 | 11/1980 | Tanoue et al. | 310/317 X |
| 4,429,268 | 1/1984 | Yajima et al. | 318/696 |
| 4,554,477 | 11/1985 | Ratcliff | 318/118 X |
| 4,703,213 | 10/1987 | Gäsier | 310/316 |
| 4,713,571 | 12/1987 | Suzuki et al. | 310/316 |
| 4,743,788 | 5/1988 | Takagi et al. | 310/316 |
| 4,749,896 | 7/1988 | Suzuki et al. | 310/316 |
| 4,754,186 | 6/1988 | Choperena et al. | 318/116 X |
| 4,794,294 | 12/1988 | Shimizu et al. | 310/316 |
| 4,833,358 | 5/1989 | Suzuki et al. | 310/317 X |
| 4,849,872 | 7/1989 | Gässler | 310/316 X |
| 4,853,579 | 8/1989 | Kawasaki et al. | 318/116 X |

FOREIGN PATENT DOCUMENTS

| | | |
|---|---|---|
| 63-023572 | 1/1988 | Japan . |
| 63-209482 | 8/1988 | Japan . |
| 967914 | 10/1982 | U.S.S.R. .......... 318/460 |

Primary Examiner—A. Jonathan Wysocki
Attorney, Agent, or Firm—Fitzpatrick, Cella, Harper & Scinto

[57] ABSTRACT

A driving circuit for a vibration wave driven motor, having a comparator detecting the drive state of the motor, and the drive frequency somewhat increased immediately before the motor reaches the resonance drive state. Also a second comparator is additionally provided for detecting the drive state of the motor at a second frequency higher than the frequency detected by the first-mentioned comparator, and the drive frequency of the motor is retained if the second comparator detects that the motor is driven with the second frequency.

9 Claims, 5 Drawing Sheets

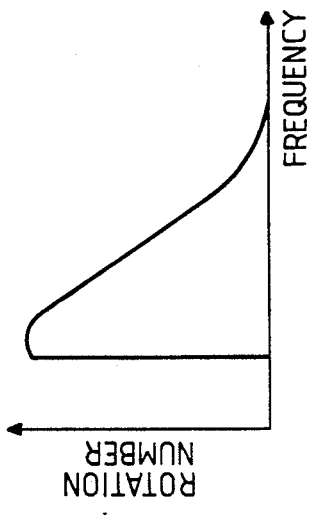
FIG. 4A
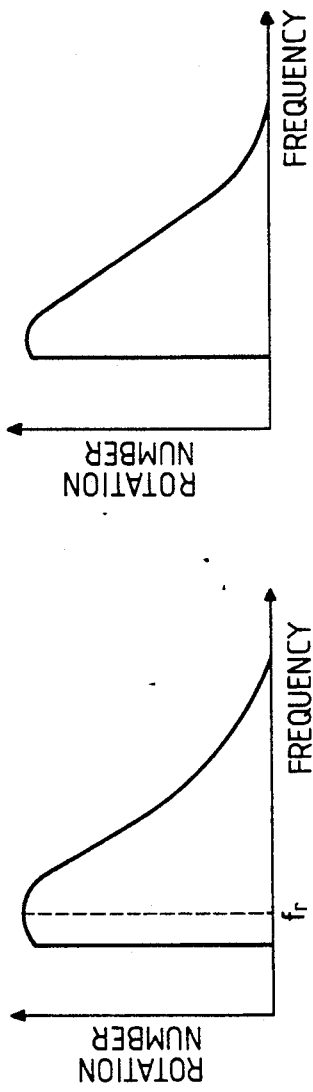
FIG. 5A
FIG. 5B
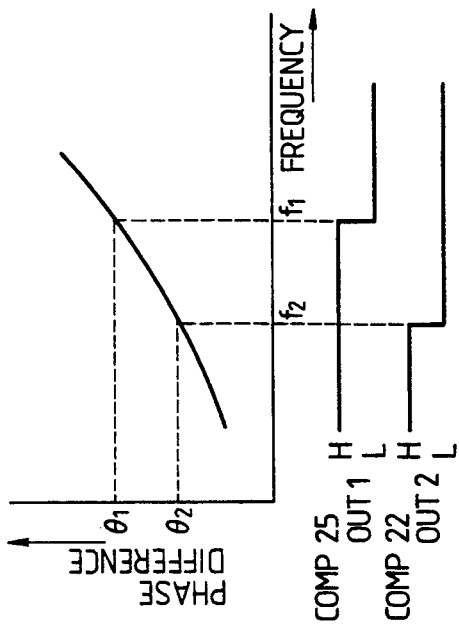
FIG. 5C
FIG. 4B

DRIVING CIRCUIT FOR VIBRATION WAVE DRIVEN MOTOR

This application is a continuation of application Ser. No. 518,233, filed May 7, 1990, which is a continuation of Ser. No. 357,785, filed May 30, 1989, both now abandoned.

BACKGROUND OF THE INVENTION

1. Field of the Invention

The present invention relates to a driving circuit for a vibration wave motor.

2. Related Background Art

The present applicant already disclosed, in the Japanese Laid-open Patent Sho 63-23572, a driving circuit for a vibration wave motor. FIG. 2 illustrates the device disclosed in said Japanese Laid-open Patent Sho 63-23572. wherein a stator (vibration member) 1 of the vibration wave motor is provided with drive electrodes 1-1, 1-2, a resonance state detecting electrode 1-3, and a common electrode 1-4. A phase comparator 2, a low-pass filter 3, a voltage-controlled oscillator 4 and a 1/32 frequency divider 5 constitute a phase-locked loop (PLL) for generating a frequency, from the oscillator 4, of 32 times compared to that of the output of an oscillator 19 to be explained later. There are provided shift registers 6, 7 for phase shifting, in which the shift register 6 is used for generating a signal of a phase difference of 90° to be supplied to the drive electrodes of the vibration wave motor, while the shift register 7 is used for generating a phase difference necessary for causing the drive frequency to follow the resonance frequency of the motor. As said shift registers 6, 7 receive, at the clock input terminals thereof, a frequency of 32 times of the driving frequency of the vibration wave motor, there is conducted a phase shift of 360°/32=11.25° per stage of said shift registers. AND gates 9, 10 transmit the signals necessary for driving the vibration wave motor, only when an H-level signal is supplied to a START/STOP signal input terminal. The outputs of said AND gates 9, 10 are respectively connected to amplifiers 11, 12, of which outputs are respectively connected to the drive electrodes 1-1, 1-2 of the motor through coils 13, 14. Said amplifiers 11, 12 serve to amplify the output signals of the AND gates 9, 10 to a voltage necessary for driving the vibration wave motor, while the coils 13, 14 constitute serial resonance circuits in combination with the stator electrodes of the motor, for amplifying the drive signal and selecting a single frequency. Level comparators 15, 16 respectively are provided for detecting the phase of the signal wave of the drive electrodes 1-1, and for detecting the phase of the signal wave from the resonance state detecting electrode 1-3. The output of said level comparator 15 is supplied to a data input terminal of the shift register 7, of which output terminal is connected to the input terminal of a phase comparator 17. Also the output of the level comparator 16 is supplied to the input terminal of a phase comparator 17, of which output is supplied through a low-pass filter 18 to a voltage-controlled oscillator 19 for generating the drive signal for the vibration wave motor. The above-mentioned elements 17, 18, 19 constitute a phase locked loop (PLL). The vibration wave motor is included in said loop and is controlled following the resonance frequency thereof. In the above-explained structure, the output of the oscillator 19 is supplied to the electrodes 1-1 and also to an input end D of the shift register 6. Since said register 6 receives, at a clock input terminal thereof, the output of the oscillator 4 having a frequency of 32 times of that of the oscillator 19, an 8th-stage output OUT of said register 6 is shifted by 90° with respect to the output of the oscillator 19 and is supplied to the electrodes 1-2. Thus the electrodes 1-1, 1-2 receive periodical voltages with a mutual phase difference of 90° to generate a travelling vibration wave in said stator 1, thereby driving a movable member 1A maintained in contact with said stator. As described in the cited Japanese Laid-open Patent, electromechanical energy conversion elements such as piezoelectric elements or electrostrictive elements are provided on the electrodes 1-1, 1-2 formed on the stator, and generate said travelling vibration wave in response to the above-mentioned periodical voltages of different phases supplied to said electrodes.

The signal to the electrodes 1-1 is also supplied to an input terminal D of the register 7, which also receives the output clock signal of said oscillator 4, so that said register 7 releases, from an output terminal OUT thereof, a signal shifted by a certain amount in phase with respect to the signal supplied to the electrodes 1-1. In a predetermined position of the stator 1 there is provided a piezoelectric or electrostrictive element for monitoring the vibration state of said stator, and the output of said element is detected by an electrode 1-3. The vibration wave motor has a property that, in the resonance state, the drive signal supplied to the electrodes 1-1 and the output signal monitored by the electrode 1-3 show a certain phase difference. Thus, if the amount of phase shift in said register 7 is selected equal to said certain phase difference, the phase difference between the input signals to the comparator 17 becomes zero at the resonance state but becomes larger as the drive state is displaced from the resonance state. Therefore said phase difference is detected by a phase-locked loop composed of the elements 17, 18, 19, and the drive control is so conducted as to realize the resonance state.

More specifically, if the output frequency of the voltage-controlled oscillator 19 is higher than the resonance frequency of the vibration wave motor, the phase of the output signal from the electrode 1-3 is delayed in comparison with that in the drive with the resonance frequency. This delay is detected by the level comparators 15, 16, shift register 7 and phase comparator 17 whereby the phase comparator 17 releases an L-level output signal, which is supplied through the low-pass filter to the voltage-controlled oscillator 19 to reduce the output frequency thereof. On the other hand, if the output frequency of the voltage-controlled oscillator 19 is lower than the resonance frequency, the electrode 1-3 releases an output signal with advanced phase, which causes the phase comparator 17 to release an H-level output signal, whereby the input voltage of the voltage controlled oscillator 19 is elevated to increase the output frequency thereof. In such conventional device, therefore, the control is so conducted that the motor is always driven with the resonance frequency.

However such conventional device is associated with drawbacks that the start and stop of the motor are abrupt and involve shocks because the motor is immediately driven in the resonance state in response to an H-level signal given to the START/STOP terminal, and that the regulation of revolution of the motor is difficult to achieve.

In order to eliminate these drawbacks, the present applicant already proposed, in the Japanese Patent Application Sho 62-41862, a device shown in FIG. 3, in which same components as those in FIG. 2 are represented by same numbers and will not be explained further. A programable oscillator 8, with an oscillation frequency determined by a signal from a CPU 24, releases the drive signal for the vibration wave motor, corresponding to the output signal of the voltage controlled oscillator 19 shown in FIG. 2. The AND gates 9, 10 are connected, at an input terminal each, to an output port of the CPU and control the start and stop of the vibration wave motor according to the output signal of the CPU. The outputs of the shift register and the level comparator 16 are supplied to a phase comparator 20 which is so constructed as to release an H-level output signal in a period from the upshift of the output signal of the shift register 7 to the upshift of the output signal of the level comparator 16, and said output signal is supplied to an enable input terminal of a counter 21. A clock input terminal of said counter 21 is connected to the output terminal of the voltage-controlled oscillator 4 for generating a frequency of 32 times. Consequently a count of the counter 21 corresponds to a phase difference of 11.25°. Parallel outputs of the counter 21 are supplied to data input terminals of a magnitude comparator 22. A data latch 23 latches an output value from the CPU 24 and sends outputs to other data input terminals of the magnitude comparator 22, which compares two input data and, when the data released from the counter 21 become smaller, releases an H-level signal from an output terminal connected to the CPU 24.

In the above-explained structure, when the vibration wave motor is driven by an H-level signal from the CPU 24 to the AND gates 9, 10, a phase difference corresponding to the frequency set in the oscillator 8 is supplied to the input terminal of the phase comparator 20. If the frequency set in the oscillator 8 is higher than the resonance frequency, the phase of the output signal of the level comparator 16 is delayed in comparison with the resonance state, so that the H-level state of the output signal of the phase comparator 20 becomes longer. Thus the counter 21 is enabled for a longer period and releases larger output data. The CPU 24 sets certain data in the data latch 23 in advance, in such a manner that the output data of the counter 21 become larger than the data set in said data latch 23 when the drive frequency is higher than the resonance frequency. Consequently the magnitude comparator 22 releases an L-level output signal when the drive frequency is higher than the resonance frequency. The CPU 24 gradually reduces the frequency set in the oscillator 8, according to a control program, during the L-level output from the magnitude comparator 22 for the purpose of speed control of the motor, thereby gradually bringing the motor toward the resonance drive state (high speed rotation state). In the course of variation of frequency explained above, there may be encountered inconveniences such as an abrupt decrease in the revolution of the motor if a frequency lower than the resonance frequency is selected.

The vibration wave motor has a property, as shown in FIG. 4A, of attaining a high speed at the resonance frequency fr but abruptly stopping if the frequency is reduced beyond said resonance frequency. For this reason, in the circuit shown in FIG. 3, the comparator 22 sends an H-level signal to the CPU 24 as shown in FIG. 4B when the count of the counter 21 becomes smaller than a predetermined value of the latch 23 which is selected slightly larger than the count of the counter 21 in the resonance state, whereby the drive frequency is set higher, by a predetermined amount, than the current frequency, and is therefore prevented from becoming lower than the resonance frequency. This circuit can therefore gradually bring the motor to the high speed rotation state, can also arbitrarily select the rotation speed through the selection of frequency, and can still prevent the stoppage of motor resulting from a reduction of frequency beyond the resonance frequency.

In practice, however, the phase relationship between the drive signal of the vibration wave motor and the signal from the detection electrode is not always detectable in stable manner but varies slightly depending on the rotation angle of the motor, and the signals involve high frequency noises. For this reason, if the vibration wave motor is driven at a high speed in a state close to the resonance frequency, the CPU 24 sets the frequency so as to obtain an L-level output signal from the comparator 22 and frequently changes the frequency set in the oscillator 8 due to the fluctuation in phase and the noises mentioned above. Such operation has resulted in mechanical vibrations and noise sounds in the vibration wave motor.

More specifically, when the comparator releases an H-level signal, the current drive frequency is reset to a somewhat higher frequency as explained above. As a result the comparator 22 releases an L-level signal to again enable a reduction of the frequency, whereby the drive frequency is somewhat reduced. These processes are thereafter repeated, so that the drive frequency always fluctuates by a small predetermined amount.

This drawback can be prevented by simply prohibiting the reduction of the drive frequency to a lower frequency when an H-level signal is released from the comparator 22. However such simple prohibition of change in the frequency may result in an abrupt stoppage of the motor, in case of a change (increase) of the resonance frequency resulting for example from the above-mentioned fluctuation in phase, as the drive frequency which is higher than the resonance frequency and which is subjected to the prohibition of frequency change, may become lower than the thus varied resonance frequency.

SUMMARY OF THE INVENTION

The object of the present invention is to eliminate the above-mentioned drawbacks, and to prevent abrupt stoppage of the motor resulting from the drive frequency becoming lower than the resonance frequency, even in the presence of a change thereof, thereby achieving stable drive of the vibration wave motor.

Other objects of the present invention will become fully apparent from the following description of the invention.

BRIEF DESCRIPTION OF THE DRAWINGS

FIGS. 4A and 4B are charts showing the function of the circuit shown in FIG. 3;

FIGS. 5A, 5B and 5C are charts showing the function of the circuit shown in FIG. 1.

DETAILED DESCRIPTION OF THE PREFERRED EMBODIMENTS

Figure 1:
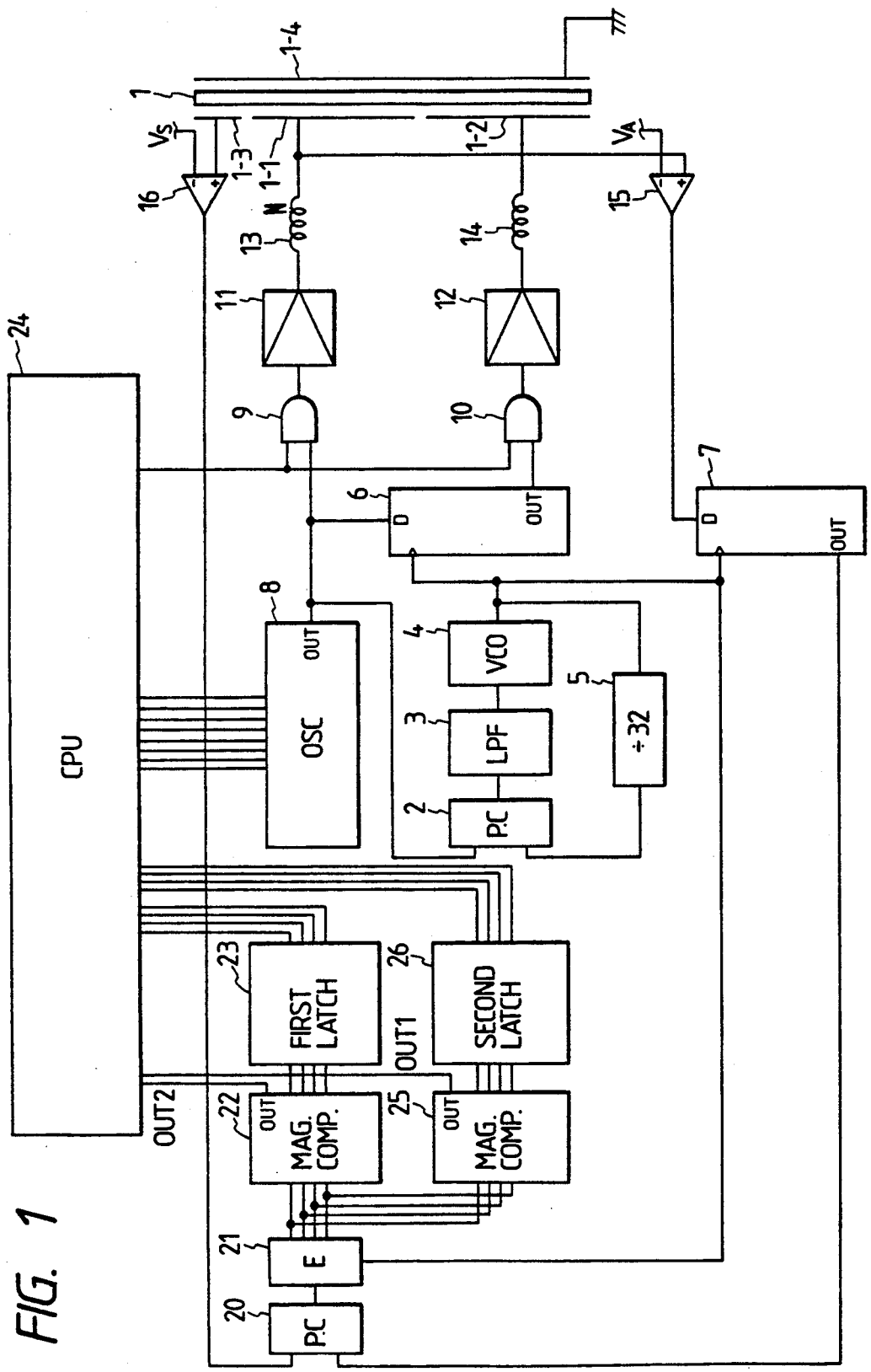
FIG. 1 is a circuit diagram of an embodiment of the driving circuit for vibration wave motor of the present invention.
Figure 2:
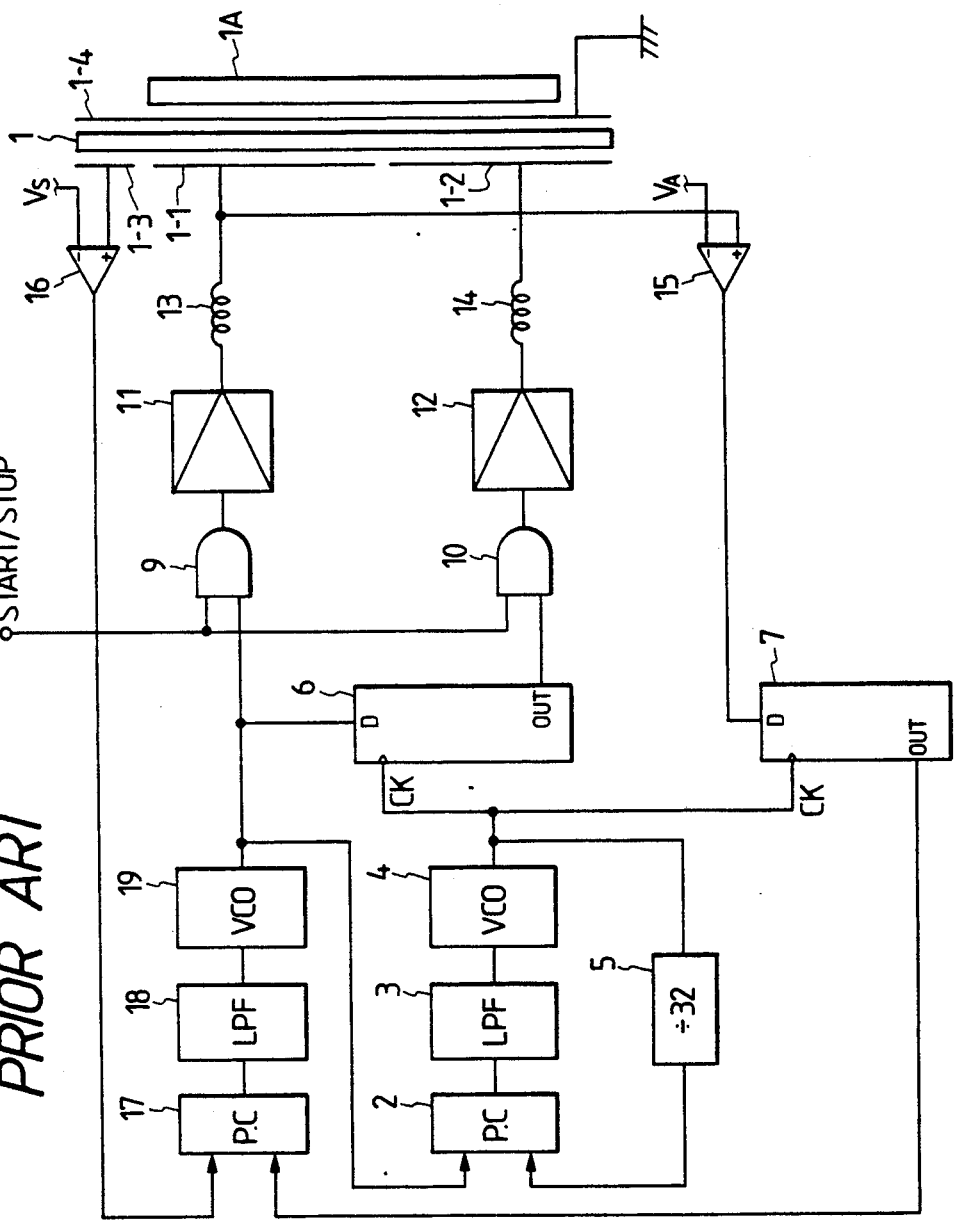
FIG. 2 is a circuit diagram of a conventional driving circuit for vibration wave motor.
Figure 3:
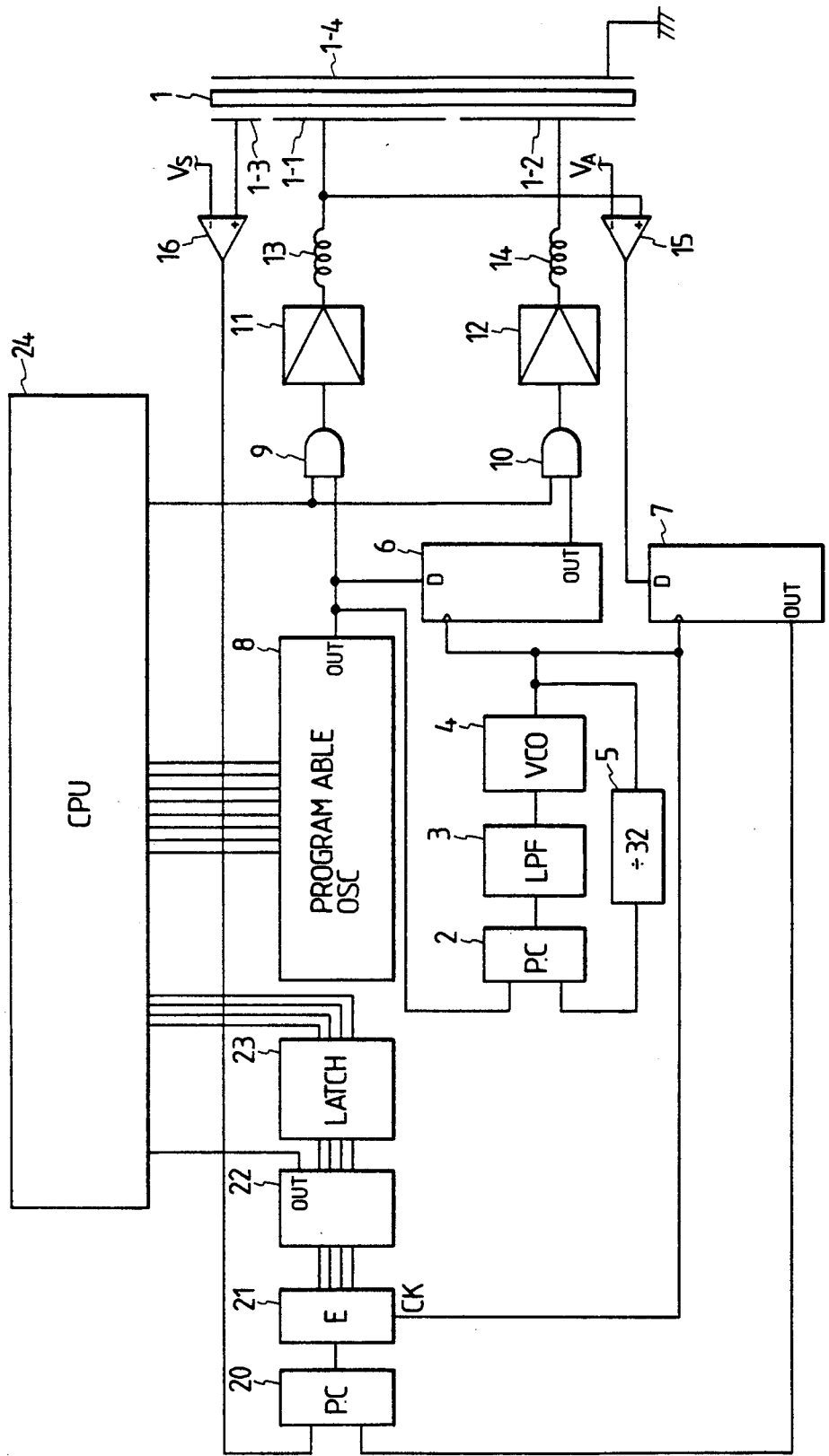
FIG. 3 is a circuit diagram of a driving circuit proposed in a prior patent application of the present applicant.

FIG. 1 is a circuit diagram of an embodiment of the driving circuit for vibration wave motor of the present invention, wherein same components as those in FIG. 3 are represented by same numbers and will not be explained further.

In FIG. 1, there are further provided a second data latch for latching data set by the CPU 24; and a second magnitude comparator 25 for comparing the output of the counter 21 and data set in the data latch 36 and releasing an H-level output signal if the output of the counter 21 is smaller. The value set in the latch 26 is larger than that in the first data latch 23.

Now reference is made to FIGS. 5A, 5B and 5C for explaining the function of the circuit shown in FIG. 1.

At the start of the vibration wave motor, the driving is started with a high frequency, and the frequency is gradually lowered thereafter. Thus a frequency $f_1$ shown in FIG. 5B is thus reached, whereby the output OUT1 (FIG. 5C) of the magnitude comparator 25 assumes the H-level. Said signal OUT1 causes the CPU 24 to terminate the reduction of the frequency. Stated differently, at this point, the CPU 24 terminates the reduction of frequency set in the oscillator 8, and the vibration wave motor is driven with a constant frequency at this point. However, a change for example in the pressure between the stator and rotor of the motor, depending on the rotation angle thereof, may cause a change in the resonance frequency, whereby the output OUT2 of the magnitude comparator 22 (FIG. 5C) may assume the H-level. Said signal OUT2 signifies that the set frequency is too low, and causes the CPU 24 to increase the frequency set in the oscillator 8. Thus, in response to said H-level signal OUT2, the CPU 24 increases the frequency set in the oscillator 8 by a step, whereby the revolution of the vibration wave motor is normally driven stably at a high speed, and is never driven with a frequency lower than the resonance frequency.

The values set in the latches 23, 26 respectively correspond to phase differences $\theta_2$ and $\theta_1$ shown in FIG. 5B.

Figure 6:
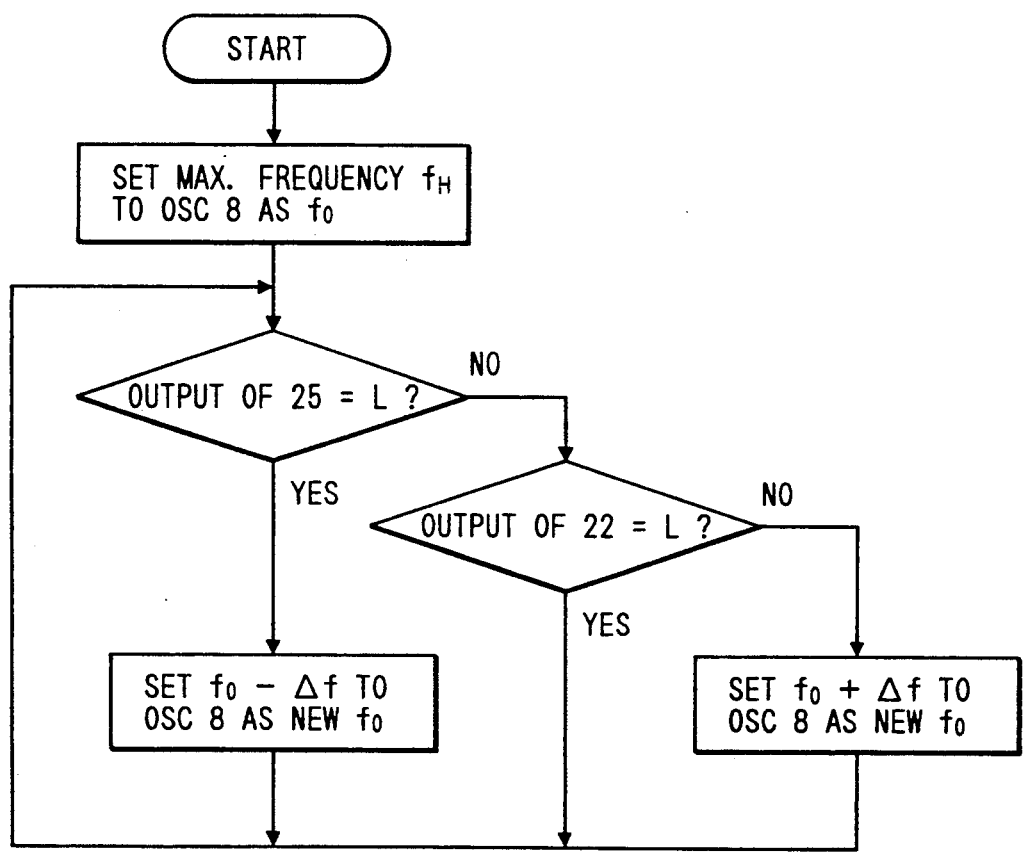
FIG. 6 is a flow chart showing the control sequence of the circuit shown in FIG. 1.

FIG. 6 is a flow chart of a control program stored in the CPU 24 shown in FIG. 1, and the drive frequency is determined as explained above, according to said flow chart.

In the foregoing embodiment, as explained above, the frequency is retained unchanged in response to the H-level signal from the comparator 25 when the motor becomes close to the resonance drive state, whereby the motor is driven in stable manner. Also if the resonance frequency shows a change (increase) from this state whereby said retained drive frequency becomes still closer to the resonance drive state, the comparator 22 serves to shift the drive frequency to a somewhat higher value. Thus the drive frequency of the motor does not assume a value lower than the resonance frequency, and, in the present embodiment, the drive frequency is maintained in a range between $f_1$ and $f_2$ shown in FIG. 5B.

In the foregoing embodiment there are employed two magnitude comparators, but it is also possible to use three magnitude comparators.

Also the function of said magnitude comparators may be replaced by a software process of the CPU 24 which receives the output of the counter 21 in this case.

In such case it is possible to improve the precision by reading the output of the counter 21 plural times and comparing the averaged value with a reference value.

Also in the foregoing embodiment the movable member is driven by the travelling vibration wave generated in the stator, but it is also possible to drive said stator. In such case the movable member in the foregoing embodiment is naturally fixed.

As explained in the foregoing, the driving circuit of the present invention is capable of stabilizing the drive frequency in a high-speed drive close to the resonance drive state and prevents the drive frequency from assuming a value lower than the resonance frequency, thus providing significant advantages in driving the vibration wave motor.

I claim:

1. A driving device for a vibration wave driven motor having a vibration member and a movable member capable of mutual displacement by a travelling vibration wave generated in said vibration member, comprising:
   a) varying means for varying the frequency of a periodic electrical signal to be supplied to an electromechanical energy conversion element provided on said vibration member;
   b) detection means for monitoring the vibration state of said motor and generating a first output when the vibration state assumes a first state close to the resonance state and a second output when the vibration state assumes a second state closer than said first state to the resonance state;
   c) prohibition means for disabling the frequency varying operation by said varying means, in response to said first output from said detection means; and
   d) shift means for shifting said frequency by a predetermined amount in response to said second output from said detection means.

2. A driving device according to claim 1, wherein said shift means shifts said frequency to a higher region in response to said second output from said detection means.

3. A vibration wave driven motor, comprising:
   a) a vibration member equipped with an electromechanical energy conversion element and adapted to generate a travelling vibration wave when a periodic electrical signal is applied to said conversion element;
   b) a receiving member provided in contact with said vibration member and adapted to receive said travelling vibration wave, whereby the travelling vibration wave causes a relative displacement between said receiving member and said vibration member;
   c) varying means for varying the frequency of the periodic electrical signal;
   d) detection means for monitoring the vibration state of said motor and generating a first output when the vibration state assumes a first state close to the resonance state, and a second output when the vibration state assumes a second state closer than said first state to the resonance state;
   e) prohibition means for disabling the frequency varying operation by said varying means, in response to said first output from said detection means; and f) shift means for shifting said frequency by a predetermined amount in response to said second output from said detection means.

4. A vibration wave driven motor according to claim 3, wherein said shift means is adapted to shift said frequency to a higher region in response to said second output from said detection means.

5. A vibration wave driven motor according to claim 3, wherein said detection means includes a comparator outputting the first output and the second output respectively.

6. A vibration wave driven motor, comprising:

a) a vibration member for generating a travelling vibration wave to effect mutual displacement between said vibration member and a movable member contactable therewith in response to an applied electrical signal;

b) a varying circuit for varying the frequency of the electrical signal from a high region to a low region;

c) a detector, responsive to the vibration state of said motor, for signalling that the vibration state has reached a first state close to the resonance state of the motor, and for signalling that the vibration state has reached a second state closer than said first state to the resonant state;

d) a prohibiting circuit for disabling the frequency varying operation by said varying circuit in response to said detector signalling that the vibration state has reached the first state; and e) a shifting circuit for shifting said frequency to a higher region in response to said detector signalling that the vibration state has reached the second state.

7. A vibration wave motor, comprising:

a) a vibration member for generating a vibration wave to effect mutual displacement between said vibration member and a movable member contactable therewith in response to an applied electrical signal;

b) a varying circuit for varying the frequency of the electrical signal from a high region to a low region;

c) a detector, responsive to the vibration state of said motor, for signalling that the vibration state has reached a first state close to the resonance state of the motor, and for signalling that the vibration state has reached a second state closer than said first state to the resonant state;

d) a prohibiting circuit for disabling the frequency varying operation by said varying circuit in response to said detector signalling that the vibration state has reached the first state; and e) a shifting circuit for shifting said frequency to a higher region in response to said detector signalling that the vibration state has reached the second state.

8. A vibration wave driven motor, comprising:

a) a vibration member for generating a vibration wave to effect mutual displacement between said vibration member and a movable member contactable therewith in response to an applied electrical signal;

b) a varying circuit for varying the frequency of the electrical signal from one frequency to another frequency, whereby the vibration state of said motor is varied in accordance with the frequency varying operation;

c) a detector, responsive to the vibration state of said motor, for signalling that the vibration state has reached a first state close to the resonance state of the motor, and for signalling that the vibration state has reached a second state closer than said first state to the resonant state;

d) a prohibiting circuit for disabling the frequency varying operation by said varying circuit in response to said detector signalling that the vibration state has reached the first state; and e) a shifting circuit for shifting said frequency by a predetermined amount in response to said detector signalling that the vibration state has reached the second state.

9. Driving circuitry for a vibration wave driven actuator having a vibration member to generate a vibration wave in response to an applied electrical signal, comprising:

(a) a varying circuit for varying the frequency of the electrical signal from one frequency to another frequency, whereby the vibration state of said actuator is varied in accordance with the frequency varying operation;

(b) a detector, responsive to the vibration state of said actuator, for signalling that the vibration state has reached a first state close to the resonance state of the actuator, and for signalling that the vibration state has reached a second state closer than said first state to the resonant state;

(c) a prohibiting circuit for disabling the frequency varying operation by said varying circuit, in response to said detector signalling that the vibration state has reached the first state; and (d) a shifting member for shifting said frequency by a predetermined amount in response to said detector signalling that the vibration state has reached the second vibration state.

* * * * *

UNITED STATES PATENT AND TRADEMARK OFFICE
CERTIFICATE OF CORRECTION

PATENT NO. : 5,165,047
DATED      : November 17, 1992
INVENTOR(S): SHIMIZU

It is certified that error appears in the above-identified patent and that said Letters Patent is hereby corrected as shown below:

On the title page,
[56] References Cited

"Gäsier" should read --Gäsler--.

ABSTRACT

Line 3, "frequency" should read --frequency is--.

Signed and Sealed this

Twenty-eighth Day of December, 1993

Attest:

BRUCE LEHMAN

Attesting Officer        Commissioner of Patents and Trademarks